(12) United States Patent
Wilhelm et al.

(10) Patent No.: US 10,350,666 B2
(45) Date of Patent: Jul. 16, 2019

(54) TOOLS AND METHODS FOR HANDLING WORKPIECES

(71) Applicant: TRUMPF Werkzeugmaschinen GmbH + Co. KG, Ditzingen (DE)

(72) Inventors: Markus Wilhelm, Gerlingen (DE); Maximillian Bauser, Simmonzheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 33 days.

(21) Appl. No.: 15/713,961

(22) Filed: Sep. 25, 2017

(65) Prior Publication Data
US 2018/0085813 A1 Mar. 29, 2018

(30) Foreign Application Priority Data

Sep. 26, 2016 (DE) .................. 10 2016 118 153

(51) Int. Cl.
 *B21D 28/12* (2006.01)
 *B21D 28/36* (2006.01)
 (Continued)

(52) U.S. Cl.
 CPC ........... *B21D 28/12* (2013.01); *B21D 28/125* (2013.01); *B21D 28/36* (2013.01); *B21D 43/18* (2013.01); *B23K 26/38* (2013.01); *B25J 15/0683* (2013.01)

(58) Field of Classification Search
 CPC .............. B25B 11/007; B25J 15/0616; B25J 15/0683; B25J 15/0691; B65G 47/91; B65G 47/918; B65G 47/061; B66C 1/02; B66C 1/0237; B66F 9/181; B21D 28/12; B21D 28/125; B21D 28/36; B21D 43/18; B23K 26/38

See application file for complete search history.

(56) References Cited

U.S. PATENT DOCUMENTS 2,297,950 A * 10/1942 Flaws, Jr. ................ H01K 3/10
 140/71.6
2,630,260 A * 3/1953 Petrea ....................... B65C 3/18
 271/107
(Continued)

FOREIGN PATENT DOCUMENTS

DE 8900752 U1 5/1990
DE 102005005214 A1 8/2006
(Continued)

*Primary Examiner* — Stephen A Vu
(74) *Attorney, Agent, or Firm* — Fish & Richardson P.C.

(57) ABSTRACT

Tools and methods for the handling of workpieces in a processing machine are provided herein. The tools have a tool body, having a clamping pin that is fixedly arranged on the tool body and having an indexing wheel that is arranged between the clamping pin and the tool body. At least one suction element is provided, to which a fluid channel leads, and the at least one suction element can be transferred by the indexing wheel or the tool body into an active position, in which the fluid channel is closed and, due to lengthening of the at least one suction element, the at least one suction element is attached by suction to the workpiece, and the at least one suction element can be transferred by the indexing wheel or the tool body into a rest position, in which the fluid channel is open.

19 Claims, 16 Drawing Sheets

(51) Int. Cl.
*B21D 43/18* (2006.01)
*B23K 26/38* (2014.01)
*B25J 15/06* (2006.01)

(56) References Cited

U.S. PATENT DOCUMENTS

| | | | | |
|---|---|---|---|---|
| 3,070,843 | A * | 1/1963 | Jurgeleit | B22D 17/22 425/145 |
| 2002/0129893 | A1 * | 9/2002 | Winter | B65H 1/22 156/283 |
| 2003/0118429 | A1 * | 6/2003 | Weber | H01R 43/205 414/411 |

FOREIGN PATENT DOCUMENTS

| | | |
|---|---|---|
| DE | 102009013437 A1 | 10/2009 |
| DE | 102013103123 B4 | 6/2015 |

* cited by examiner

TOOLS AND METHODS FOR HANDLING WORKPIECES

CROSS-REFERENCE TO RELATED APPLICATION

This application claims priority to German Application No. DE 10 2016 118 153.6, filed on Sep. 26, 2016. The contents of this priority application are hereby incorporated herein by reference in their entirety.

TECHNICAL FIELD

The present disclosure relates to tools and methods for handling of workpieces in processing machines.

BACKGROUND

DE 10 2013 103 123 A1 discloses a method for the removal of workpieces from a processing machine, and a processing machine that manufactures, by means of a processing device, workpieces through separating cuts from a plate-shaped material that rests on a workpiece support. After the production of the workpieces, they are taken out by means of a removal device, which device comprises a plurality of segment-shaped retaining elements. These retaining elements are formed, for example, as vacuum cups. Through active application of the vacuum, the processed workpieces can be grabbed and then transported.

DE 10 2009 013 437 A1 discloses using tools for the processing of the workpieces made of a plate-shaped material in a processing machine.

DE 89 00 752 U discloses a device for handling objects that includes a handle that has a suction cup at one end. The suction cup is open at one end, and has an internal volume that is connected to a reclosable venting opening.

SUMMARY

The present disclosure relates to tools for the handling of workpieces in a processing machine, as well as methods for the handling of workpieces processed in processing machines. Various embodiments of the invention disclosed herein permit workpieces to be handled without a compressed air connection.

In one aspect, the present disclosure provides tools, on which an indexing wheel is arranged between a basic tool body and a clamping pin that is attached to the basic tool body. The indexing wheel is rotatable relative to the basic tool body around a shared longitudinal center axis, so that at least one suction element provided on the basic tool body or the indexing wheel is transferable into an active configuration in which a fluid channel of the suction element is closed and the suction element is lengthened. The at least one suction element attaches itself to the workpiece and the at least one suction element can be transferred into a rest position by means of the indexing wheel or the basic tool body, in which rest position the fluid channel of the at least one suction element is open and therefore the at least one suction element is vented. This configuration of the tool makes it possible for the actuation of the at least one suction element to be performed in the same way as on a tool that has an analogous layout with a basic tool body, the clamping pin and an indexing wheel arranged rotatably in between to activate individual processing tools that are arranged on the basic tool body, such as punching tools. In addition, by the arrangement of at least one such suction element on the basic tool body or the indexing wheel, active application of a negative pressure or vacuum is dispensable. Instead, a passive suction element is provided that establishes a vacuum or negative pressure on the basis of a change in the volume within the suction element, in particular due to a lengthening of the suction element.

Furthermore, the at least one fluid channel of the suction element can be aligned in the direction towards the indexing wheel or the basic tool body, in accordance with particular implementations. This allows a compact arrangement to be achieved. In addition, the fundamental design of such tools comprising the basic tool body, the clamping pin, and the indexing wheel can be preserved.

In particular implementations, the indexing wheel or the basic tool body is rotated in a direction of rotation in relation to the basic tool body or the indexing wheel to activate the active position of the at least one suction element to activate the at least one suction element. The at least one suction element can be transferred to the rest position through a further rotational movement in the same direction or in an opposite direction of rotation. Here, either the basic tool body is rotated and the indexing wheel stands still, or the indexing wheel is rotated and the basic tool body stands still. It is also possible for simultaneous relative rotation to each other to take place. As a result, a flexible actuation of the at least one suction element is enabled. In particular, if a plurality of suction elements is arranged on the basic tool body or on the indexing wheel, one or more suction elements can be transferred to an active position through corresponding positioning of the indexing wheel or of the basic tool body. The indexing wheel or the basic tool body rotates around the longitudinal center axis of the basic tool body, which may correspond to a lifting axis of the basic tool body.

Furthermore, in certain implementations, at least one control element is provided on the indexing wheel or on the basic tool body that is aligned pointing towards the suction element and opens and closes the fluid channel. As a result, by means of a rotary motion of the indexing wheel or of the basic tool body around the longitudinal center axis of the basic tool body, a direct actuation of the suction element can be enabled, for example to close the fluid channel of the suction element in an active position.

The control element, which is can be formed as a closure, has a closing surface that closes the fluid channel, in accordance with particular implementations. In this closing position, the suction element is activated. Adjacent to the closing surface or adjoining onto the closing surface, a beveled incline is provided, in accordance with particular implementations. As a result of the rotary motion of the indexing wheel or of the basic tool body, it is thus possible for the closure to slide up and onto the opening of the fluid channel, resulting in subsequent sealing of the fluid channel. For simple manufacturing and assembly of the closure on the indexing wheel or on the basic tool body, the closure is formed as a mushroom-shaped sealing plug that has circumferential beveled inclines. As a result, this can be inserted in a bore on the indexing wheel in a simple fashion and fixed lengthways in relation to the fluid channel. Furthermore, alignment of the closure in relation to the indexing wheel or to the basic tool body is unnecessary.

According to certain embodiments of the tool for activation of the at least one suction element, a control disc is provided that is arranged on the indexing wheel or the basic tool body or the clamping pin, wherein the control disc is connected non-rotatably with the indexing wheel or the basic tool body or the clamping pin. This control disc comprises at least one control curve, which actuates the at least one control element, wherein the control element is provided in the suction element. In some implementations, the control element arranged in the suction element is closed in a basic position, i.e., the suction element is active. The fluid channel in the suction element is closed. Alternatively, the control element in the suction element can be open, i.e., the fluid channel is open and the suction element is in a passive position. Embodiment, in which the control element is positioned in the suction element and can be actuated by the control curve, represent particular embodiments, in which the control element is formed as a closure with a closing surface.

According to particular embodiments of the tool having a control disc, an activation disc is provided between the control disc and the basic tool body or between the control disc and the indexing wheel or between the clamping pin and the control disc, which activation disc can be actuated during a rotary movement of the control disc by means of a lifting motion along the longitudinal center axis of the basic tool body. As a result, the at least one control element arranged in the suction element can be actuated by means of the activation disc and transferred, for example, from an active—i.e., closed—position to an open—i.e., passive position.

In particular embodiments, the control element is formed as a valve. In particular, a valve having an operable plunger is provided. The plunger of the valve may protrude above a fastening section of the bellows element in the direction towards the control disc or activation disc.

In certain implementations, the at least one suction element is provided via a detachable connection on the basic tool body or on the indexing wheel. This enables a replacement in a simple fashion. In addition, in the case of the arrangement of a plurality of suction elements on the basic tool body or on the indexing wheel, it is possible in a simple fashion to correspondingly adjust the size of the workpieces that are to be handled on account of the number and/or position of the suction elements provided on the basic tool body or on the indexing wheel.

The detachable connection between the suction element and the basic tool body or the indexing wheel can take place by means of a fastening section that encloses or encompasses the suction channel. For example, a screw connection, a bayonet fitting, a snap-on connection or similar can be provided to fix the suction elements on the basic tool body or on the indexing wheel.

The at least one suction element encloses one suction cup, in particular embodiments. The at least on suction cup is formed in the shape of bellows and has a ring-shaped connection surface, in accordance with particular embodiments. As a result, it is possible in simple fashion to generate a negative pressure or vacuum by lengthening the suction cup to form an attachment to the workpiece. The suction cup may be fastened to the fastening section, in particular, in an attachable push-on fashion.

Certain embodiments of the tool have a plurality of suction elements that are arranged one after the other in a circumferential circle on the basic tool body or on the indexing wheel. In certain implementations, a plurality of control elements is provided in the same circumferential circle, wherein the number of control elements can be lower or the same as the number of suction elements. As a result, upon simultaneous activation of a plurality of suction elements an enlarged suction surface can have an effect to lift up even heavy workpieces or to enable tilt-free lifting of workpieces.

In particular embodiments, instead of a plurality of suction elements that are arranged in a circumferential circle on the basic tool body or on the indexing wheel, at least one ring-shaped suction element is provided that extends partially or completely through 360°. The handling of workpieces can also be facilitated by this.

In particular implementations of the tool, there is at least one processing tool adjacent to the at least suction element. As a result, the processing and handling of workpieces can be combined in one tool. This enables the shortening of cycle times and setup times. In the arrangement of a ring-shaped suction element on the basic tool body or of a plurality of suction elements arranged in a circumferential circle on the basic tool body, the at least one processing tool is advantageously provided within the ring-shaped suction elements or the plurality of suction elements.

The tool can feature as a processing tool at least one punching and/or clinching tool.

Furthermore, the one processing tool arranged on the basic tool body may be fixed in relation to the basic tool body, or the at least one processing tool is activatable by means of the indexing wheel. The latter means that, during the performance of a lifting movement of the tool, the activated processing tool maintains its position in relation to the basic tool body, wherein an inactive processing tool is retracted into the basic tool body. As a result, it is possible to create a so-called multiple tool, which enables different processing steps as well as handling of the workpiece.

In certain implementations, one end face of the processing tool is set back by means of at least one suction element and one processing tool in relation to one end face of the at least one suction element, or both are arranged at the same height at a distance to the basic tool body. As a result, during or after the performance of a working stroke, by means of the processing tool it is possible to achieve a compression of the suction element, so that a negative pressure can be generated within the suction element in relation to the workpiece during a subsequent lengthening, so that this suction element becomes attached to the workpiece.

In another aspect, the present disclosure provides methods for the handling of workpieces by means of a tool, in which at least one suction element arranged in a holding area of an indexing wheel is placed and compressed on the workpiece that is to be handled, and in which before, during or after the placement of the at least one suction element on the workpiece, a basic tool body, which is rotatably connected with the indexing wheel, is rotated and the at least one suction element is transferred into an active position. Subsequently, the at least one suction element is stretched or lengthened by means of lifting the tool in relation to the workpiece, as a result of which the suction element is attached by suction to the workpiece. Subsequently, the work-piece can then be lifted up. These methods enable simple and cost-effective handling of workpieces. It is not necessary to provide a compressed air supply for actuation of the at least one suction element. Instead, workpiece handling can be performed by means of at least one passive suction element. In addition, the workpiece can also be discarded above a delivery point.

In another aspect, the present disclosure provides methods for the handling of workpieces by means of a workpiece, in which at least one suction element arranged in a receiving area of a basic tool body is placed and compressed on the workpiece that is to be handled, and in which before, during or after the placement of the at least one suction element on the workpiece, the basic tool body is rotated in relation to an indexing wheel that is stationary or held in a rest position, and the at least one suction element is transferred into an active position relative to the indexing wheel. Therefore, already before the tool is placed down on the workpiece the at least one suction element is in an active position and, after the at least one suction element is placed down and compressed on the workpiece, the at least one suction element is stretched or lengthened by means of lifting the tool in relation to the workpiece, as a result of which the suction element is attached by suction to the workpiece. Subsequently, the workpiece can then be lifted up. These methods enables simple and cost-effective handling of workpieces. It is also not necessary to provide a compressed air supply for actuation of the at least one suction element for this alternative. Instead, workpiece handling can be performed by means of at least one passive suction element.

In particular implementations, the methods for the handling of workpieces by means of a tool include processing via a processing tool that is arranged on the basic tool body. In these methods, when the at least one suction element is placed or compressed on the workpiece, a processing step is performed on the work-piece by means of at least one processing tool arranged on the basic tool body. Here, the at least one suction element can be transferred before, during or after the processing step into an active position, so that the at least one suction element is activated after a working stroke of the processing tool and, at the latest, before a lifting motion of the tool opposite to the workpiece, after which the suction element is attached by suction to the workpiece and lifts it up. Such a processing tool could, for example, be a stamping punch for the purpose of, for example, cutting free bar connections, so-called micro-joints, which position in relation to a plate-shaped material or sheet skeleton a workpiece that has been quasi cut free. Likewise, by means of the tool it is, for example, possible to lift up a workpiece and transfer it to a processing position or to a position in a further workpiece, with which it is to be jointly processed, where processing is performed, for example the insertion of a punching-out, an embossing, an indentation or curvature of a tab, a marking or similar. Afterwards the workpiece can, while maintaining the positioning by means of the at least one suction element in relation to the workpiece, be moved to a further position.

The invention and further advantageous embodiments and refinements of the invention are described and explained in more detail below using the examples shown in the figures. The features indicated in the description and drawings can be applied inventively both individually and in any combination.

DETAILED DESCRIPTION

Figure 1:
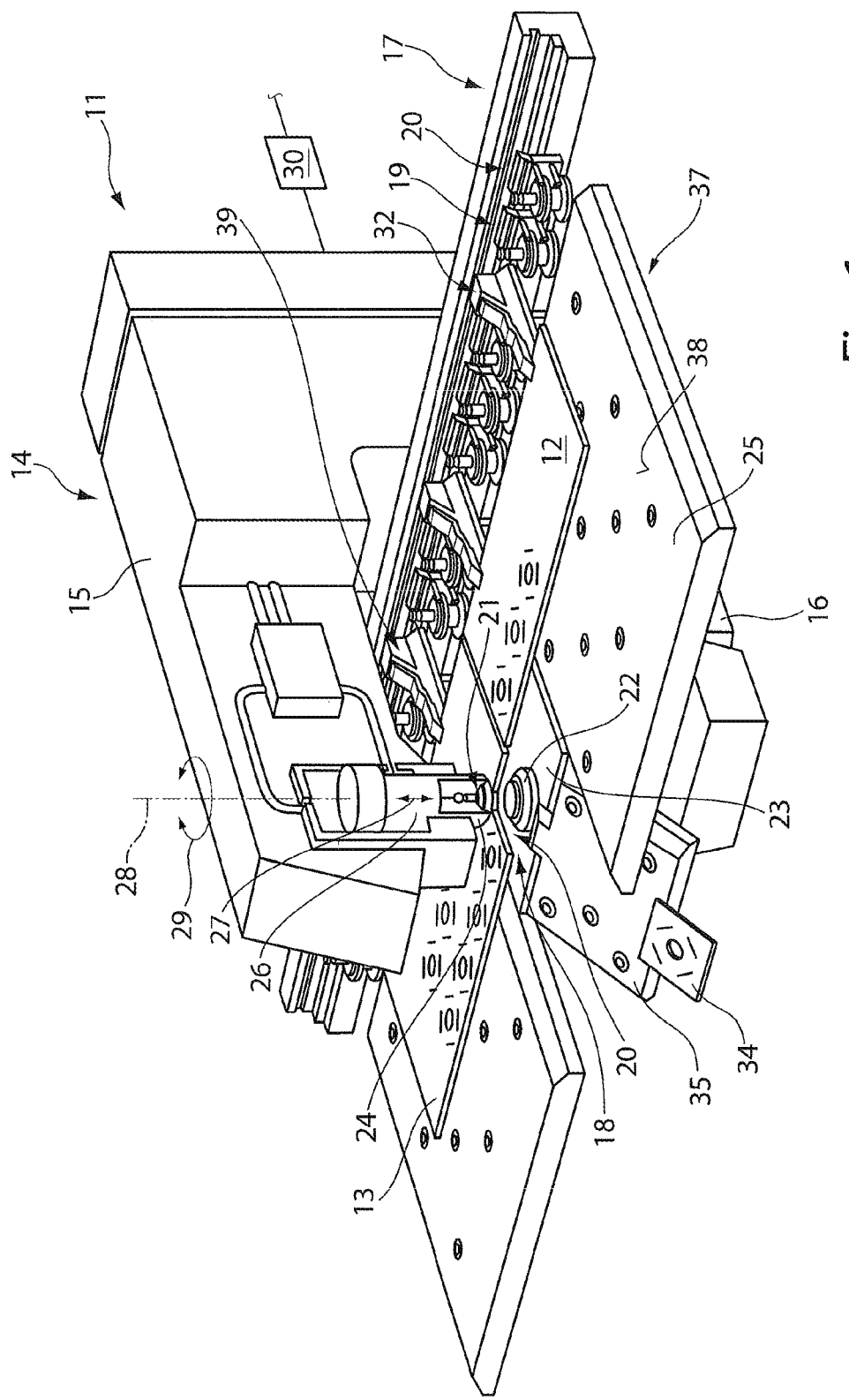
FIG. 1 shows a perspective view of a workpiece processing machine.

FIG. 1 shows a perspective view of a workpiece processing machine 11 for the processing of plate-shaped materials 12, 13, e.g. panels or plates. The workpiece processing machine 11 can receive and process only one or even a plurality of plate-shaped materials 12, 13. Here, the processing of such plate-shaped materials 12, 13 can take the form of stamping, bending, signing, embossing, engraving, deburring, roll forming, in particular roll pinching, thread forming, or also foil cutting on a foil on the surface of the plate-shaped material 12, 13. Furthermore, such a workpiece processing machine 11 can also enable cutting processing by means of a laser. The workpiece processing machine 11 has a C-shaped base frame 14 having an upper frame leg 15 and a lower frame leg 16. In a throat area between the upper frame leg 15 and the lower frame leg 16, a conventional coordinate guide 17 is housed. This serves for the positioning or movement of the plate-shaped workpieces 12, 13 in relation to a processing station 18 of the workpiece processing machine 11 and for magazine loading and for inserting/removing tools 19, 20 at the processing station 18.

At the processing station 18 a tool 19 is inserted, which comprises an upper tool 21 and a lower tool 22. The lower tool 22 is arranged in a lower tool holder 23 on the machine table 25, which initially rests on the lower frame leg 16 of the base frame 14. The upper tool 21 is mounted on an upper tool holder 24 of a plunger 26. The latter can be moved for example hydraulically up and down on the upper frame leg 15 of the base frame 14 in the direction of a double arrow 27. Both the upper tool 21 and the lower tool 22 are adjustable or closed around a lifting axis 28 of the plunger 26 in the direction of a double arrow 29. The closing movements are controlled by means of a controller 30 of the workpiece processing machine 11. In a working area 37 of the processing station 18, which is formed by means of at least one work-piece support 38 of the machine table 25, at least one first plate-shaped material 12 is held and movably guided in relation to the processing station 18 by means of a gripping device 32 during processing with the tool 19. Furthermore, in the working area 37, at least one further or one second plate-shaped material 13 can be held by means of a further gripping device 39, wherein this gripping device 39 advantageously corresponds to the gripping device 32. These two gripping devices 32/39 can be activated independently of each other to move the first plate-shaped material 12 and second plate-shaped material 13 on the workpiece support 38. Alternatively, further plate-shaped materials can also be arranged and received by means of further gripping devices in the working area 37.

The first plate-shaped material 12 advantageously differs from the second plate-shaped material 13. This difference can be in terms of the material thickness, the choice of material and/or the surface of the plate-shaped material. In certain embodiments, the workpiece 34 is formed from the plate-shaped material 12, 13 or the workpiece 34 is formed as a reinforced workpiece formed from the first plate-shaped material and at least one further material, such as the second plate-shaped material 13. The workpiece 34 formed is then, for example, guided out from the processing station 18 by means of lowering a table segment 35 of the machine table 25.

The tool or tools 19 can, for example, correspond to the tool and its embodiments described in DE 10 2009 013 437 A1. Likewise, the tool 19 can also be provided in embodiments according to DE 10 2005 005 214 A1.

Figure 2:
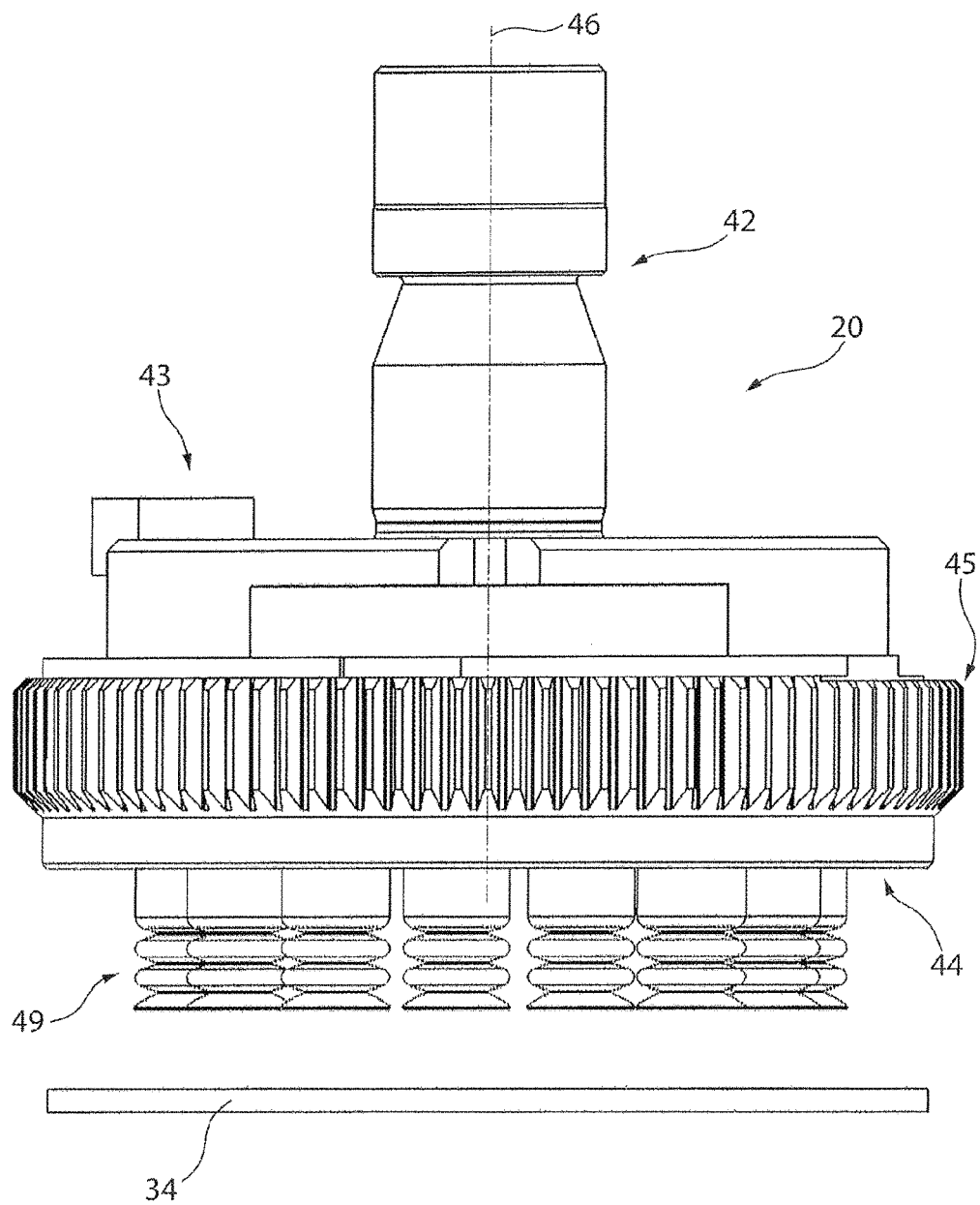
FIG. 2 shows a side view of a first embodiment of a tool.

FIG. 2 shows a side view of a first embodiment of an inventive tool 20.

Figure 3:
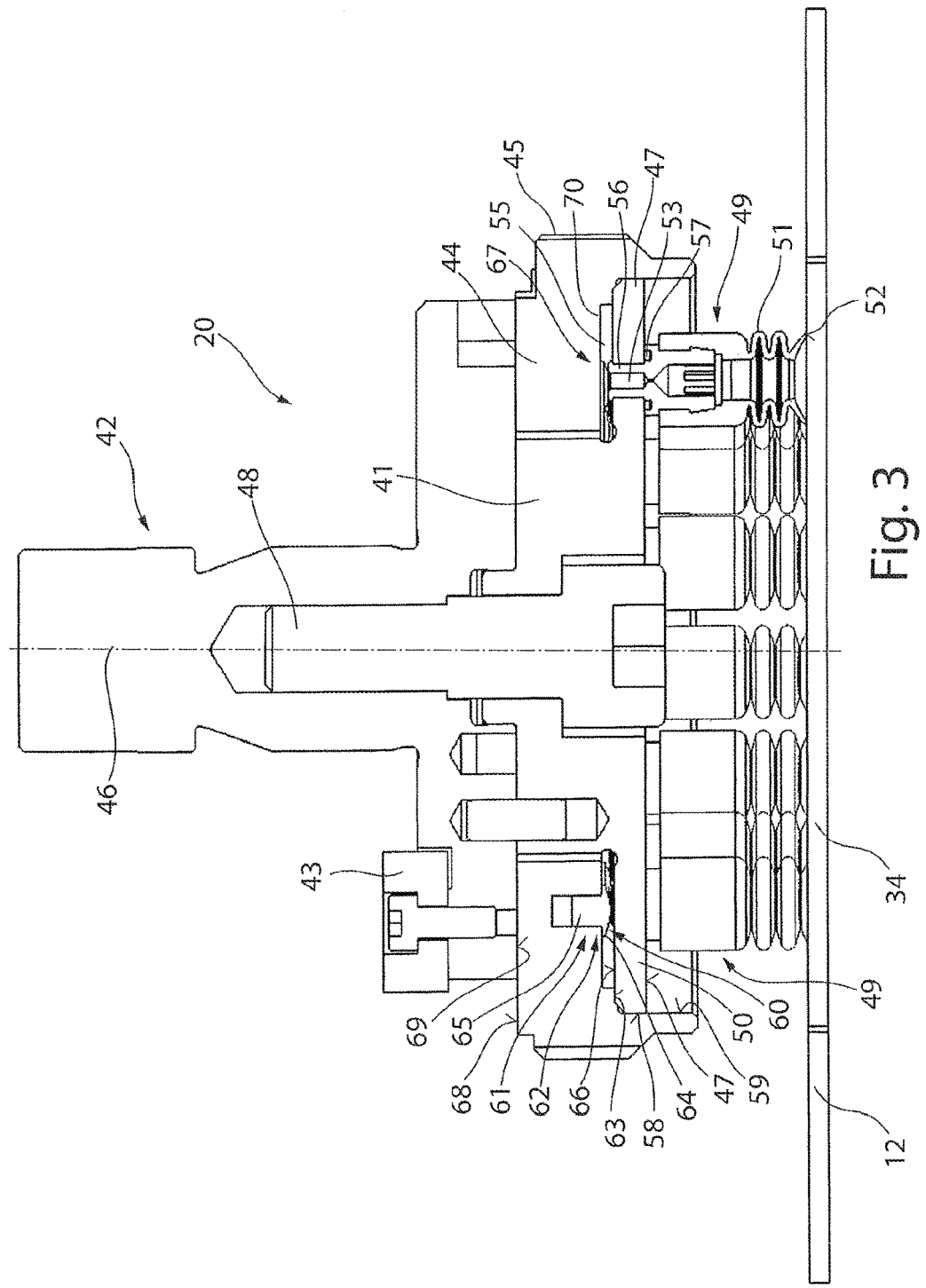
FIG. 3 shows a schematic sectional view of the tool from FIG. 2 in a rest position.

FIG. 3 shows a sectional view of the tool 20 according to FIG. 2.

The tool 20 comprises a basic tool body 41 and a clamping pin 42 connected to the body. The tool 20 is held in the upper tool holder 24 or lower tool holder 23 via the clamping pin 42. At the clamping pin 42, a positioning element 43 is provided to receive the tool 20 in a position that has a defined orientation and/or position in relation to the lifting axis 28. The tool 20 includes an indexing wheel 44 positioned between the clamping pin 42 and the basic tool body 41. The indexing wheel 44 is rotatably mounted around the longitudinal center axis 46 on the basic tool body 41. At an outer circumference of the indexing wheel 44, external teeth 45 are provided, by means of which the indexing wheel is rotatably driven on the basic tool body 41.

The basic tool body 41 has a receiving area 47 that lies opposite to the clamping pin 42. This receiving area 47 faces in the direction towards the plate-shaped material 12, 13 and/or towards a workpiece 34 to be manufactured from it. In this receiving area 47 at least one suction element 49 is provided. This receiving area 47 is formed in a ring shape. Within the ring-shaped receiving area 47 a fastening element 48, in particular a fastening screw, is provided, by means of which the basic tool body 41 is, after positioning of the indexing wheel 44 on the basic tool body 41, fixedly connected to the clamping pin 42. The basic tool body 41 has a circumferential shoulder 50, which is formed in a disc shape in certain implementations. A radial circumferential surface 58 limits the basic tool body 41, in particular the shoulder 50. By means of this radial circumferential surface 58, the indexing wheel 44 is radially guided by means of an inner circumferential surface 59 and aligned in relation to the longitudinal center axis 46. In the axial direction, a supporting surface 60 of the indexing wheel 44 is supported on an outer surface 66 of the shoulder 50. This supporting surface 60 is provided adjacent to the inner circumferential surface 59 on the indexing wheel 44.

Opposite the supporting surface 60, there is a guide surface 68 on the indexing wheel 44, which lies opposite a ring surface 69 of the clamping pin 42. The indexing wheel 44 is thus secured in axial direction in relation to the longitudinal center axis 46 between the ring surface 69 of the clamping pin 42 and the outer surface 66 of the basic tool body 41 and/or the shoulder 50 on the basic tool body 41. A free space 55 is formed between the shoulder 50 on the basic tool body 41 and a ring-shaped fastening section 70 on the indexing wheel 44.

The suction element 49 comprises a suction cup 51, which is formed in a bellows shape and has at its free end face a contact surface 52, which is a ring-shaped contact surface in particular implementations. On the opposite side, the suction cup 51 is connected to a fluid channel 53, which extends through the receiving area 47 in the basic tool body 41 until the latter leads to a free space 55. The fluid channel 53 is provided in a fastening section 56 of the suction element 49. In certain implementations, this fastening section 56 is detachably connected to the receiving area 47. For example, a screw connection can be provided. Likewise, a locking, clip, bayonet or clamping type connection can also be used. To provide a sealing arrangement between the receiving area 47 and the fastening section 56, a sealing element 57 is provided to seal an interface or connection point between the suction element 49 and the receiving area 47.

The suction cup 51 is formed from a rubber-elastic material. The rubber-elastic material can be pushed onto the fastening section 56. The length of the suction cup 51 in relation to the fluid channel 53 can be changed. As a result, a suction cup volume is also changed. In certain implementations, the suction elements 49 are positioned in an axially spring-loaded bearing arrangement to enlarge the stroke of the suction elements 49.

In the embodiment according to the FIGS. 2 and 3, a plurality of suction elements 49 is provided that are fastened in a distributed arrangement around the same circumferential circle on the receiving area 47. The suction elements 49 can be arranged with a uniform distribution around the circumference. Alternatively, the suction elements 49 can also be arranged in individual groups in relation to each other or with distances that differ from each other, as can be seen by way of example from a view from below onto the tool 20 according to FIG. 4.

Control elements 61 are provided on the indexing wheel 44 for actuation of the suction elements 49. These control elements 61 are fastened to the indexing wheel 44, aligned facing into the free space 55. The control element 61 is formed as a closure 62 for closing the fluid channel 53 of the suction element 49. The closure 62 is formed as a mushroom shape in particular implementations, so that a closing surface 63 is provided on the closure 62 that, in terms of diameter, corresponds at least to the diameter of the fluid channel 53. Adjacent to the closing surface 63, a beveled incline 64 is provided that is formed circumferentially around the closing surface 63. On the closure 62 a fastening section 65 is provided, by means of which the closure 62 is advantageously fastened in a bore in the ring-shaped fastening section 70 of the indexing wheel 44.

The closure 62 is formed from an elastic material. Alternatively, the closing surface 63 and the beveled incline 64 can be formed from a sealing material, e.g., a rubber-elastic material or a thermo-plastic or duroplastic synthetic material, and the fastening section 65 can be formed from a further material.

By means of the formation of the closing surface 63 and the beveled incline 64 that surrounds it, which have a larger diameter than the fastening section 65, the closure 62 can be inserted in simple fashion into the bore on the indexing wheel 41. At the same time, this also enables the height of the closing surface 63 to protrude in a defined position into the free space 55. As a result, it can be ensured that, in the event of a rotary motion of the indexing wheel 44, the closure 62 slides safely onto the fastening section 56 to close the fluid channel by means of the 53 closing surface 63. By means of the axial fixing of the indexing wheel 44 between the clamping pin 42 and the basic tool body 41, it is also ensured that the closing surface 63 of the closure 62 lies on the fluid channel 53 of the suction element 49 and forms a seal there.

Figure 4:
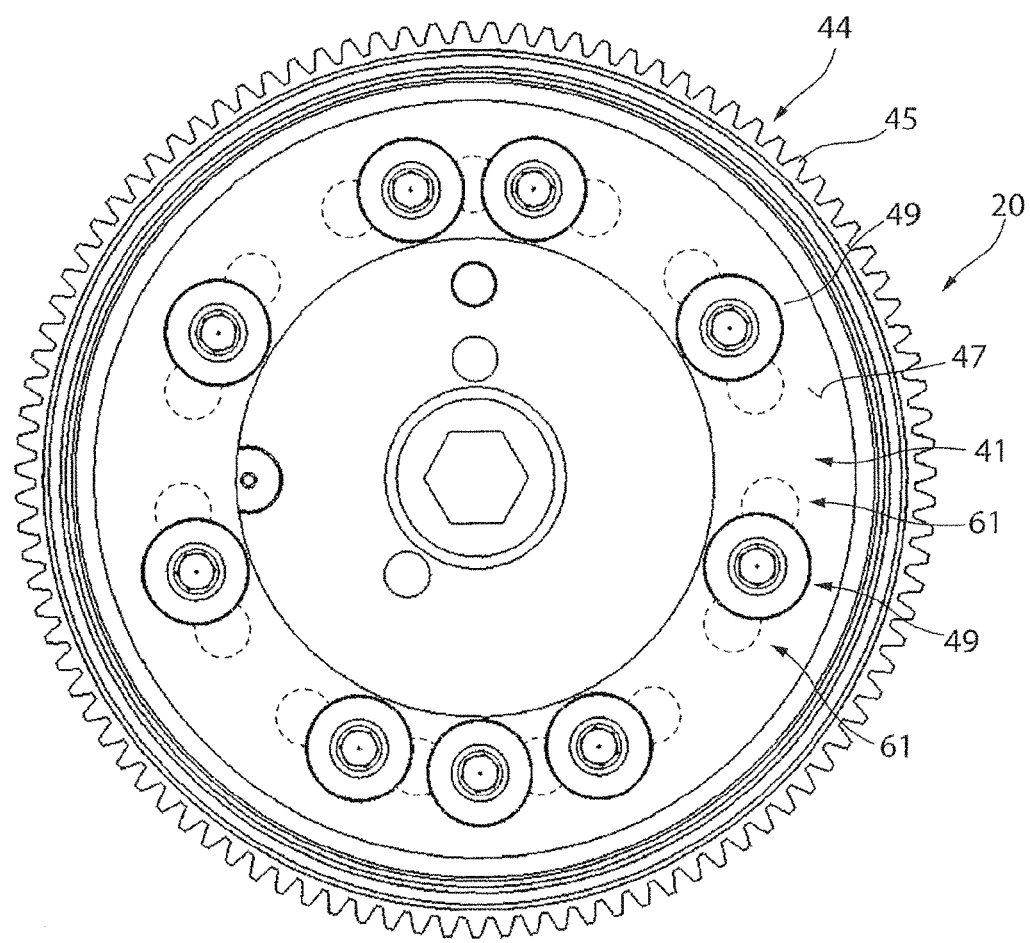
FIG. 4 shows a schematic view from below of the tool in a rest position in accordance with FIG. 3.

FIG. 3 and FIG. 4 show the tool 20 arranged in a rest position 67 in relation to the suction elements 49. The control elements 61 on the indexing wheel 44 are therefore arranged adjacent to the fluid channel 53 of the suction element 49. This can be seen, for example, from the view from below onto the tool 20 shown in FIG. 4. In this rest position 67, the fluid channel 53 of the suction element 49 is open, which means that no negative pressure can be built up in the suction element 49.

Figure 5:
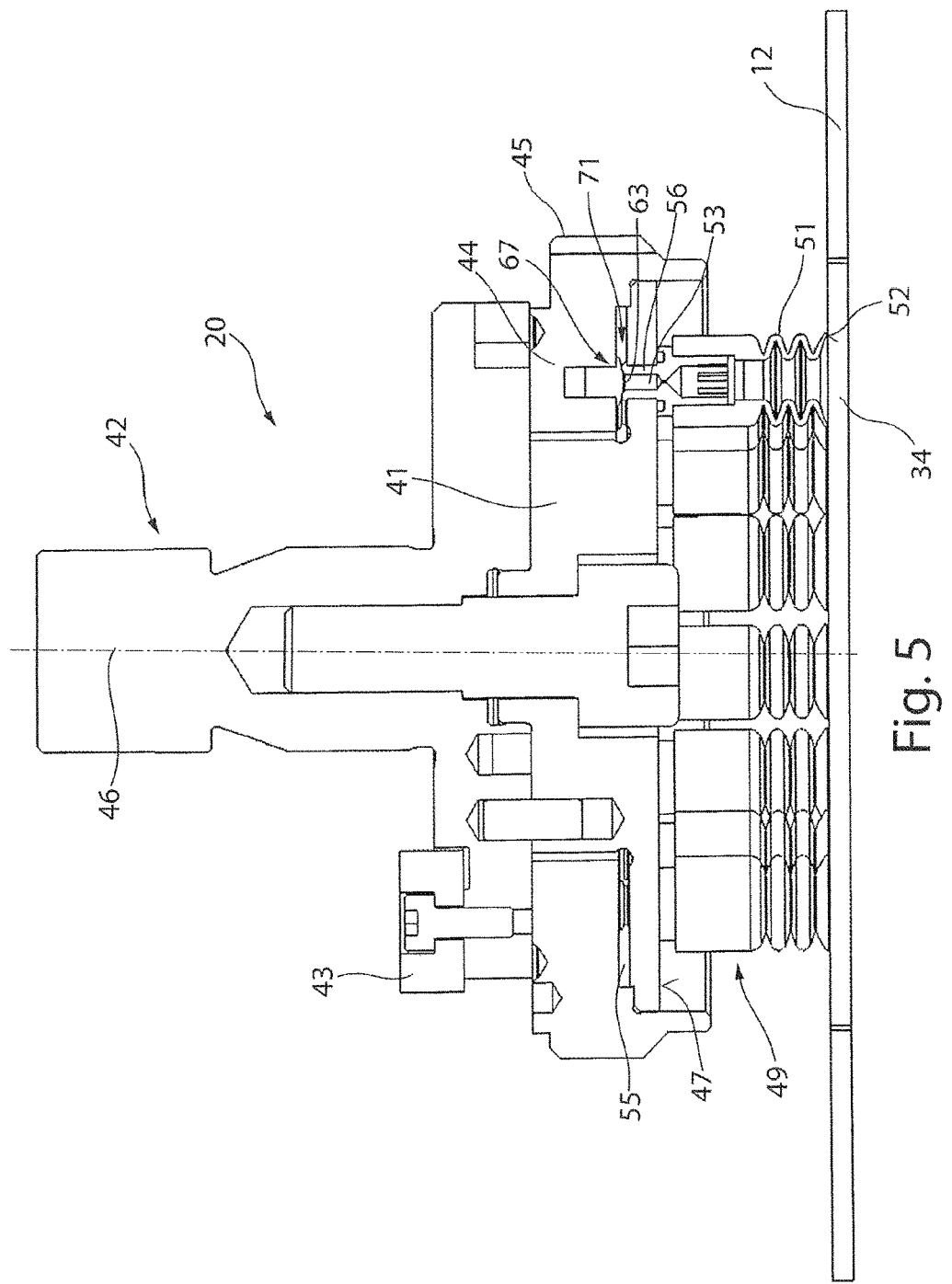
FIG. 5 shows a schematic sectional view of the tool shown in FIG. 2 in an active position.

FIG. 5 shows a schematic sectional view of the tool 20 according to FIG. 2, in which the suction elements 49 are transferred into or arranged in an active position 71. By means of an actuated rotary movement of the basic tool body 41 in relation to an indexing wheel 44 that is held stationary, the control element 61 is positioned relative to the suction element 49. Alternatively, the indexing wheel 44 could also be rotated relevant to a basic tool body 41 that is held stationary. The beveled incline 64 of the closure 62 slides onto the fastening section 56 of the suction element 49. To close the fluid channel 53, the closing surface 63 of the closure 62 completely covers the cross-section of the fluid channel 53. This active position 71 is shown in FIG. 5.

Figure 6:
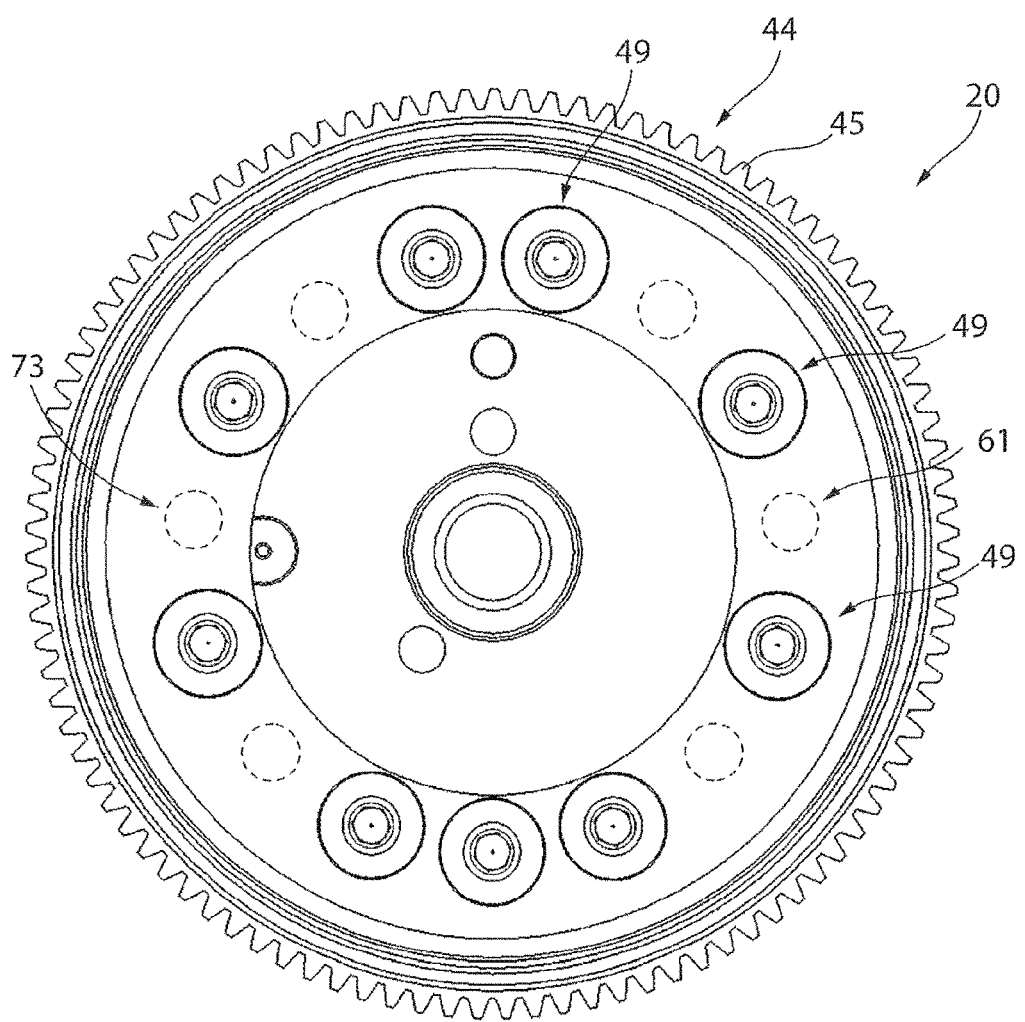
FIG. 6 shows a schematic view from below of the tool in an active position in accordance with FIG. 5.

FIG. 6 shows a view from below of the tool 20 according to FIG. 5. It can be seen from this view that positions 73, which are not occupied by suction elements 49, are provided in the receiving area 47, but in each of which, however, one control element 61 is advantageously arranged.

The suction elements 49 arranged on the receiving area 47 are in the active position 71, i.e. the fluid channel 53 of the relevant suction element 49 is closed.

As soon as the tool 20 is now moved towards the plate-shaped material 12, 13 and/or the already manufactured workpiece 34, the contact surface 52 of the suction elements 49 initially makes contact on the surface of the workpiece 34.

Afterwards, the suction element 49, in particular the suction cup 51, is compressed, so that air escapes from the suction cup 51. If the tool 20 is subsequently lifted up in relation to the workpiece 34, lengthening of the suction element 49, in particular the suction cup 51, occurs, as a result of which the suction element 49 is attached by suction to the workpiece 34. A negative pressure is produced in the suction element 49, as a result of which the holding force to the workpiece 34 is generated.

Figure 7:
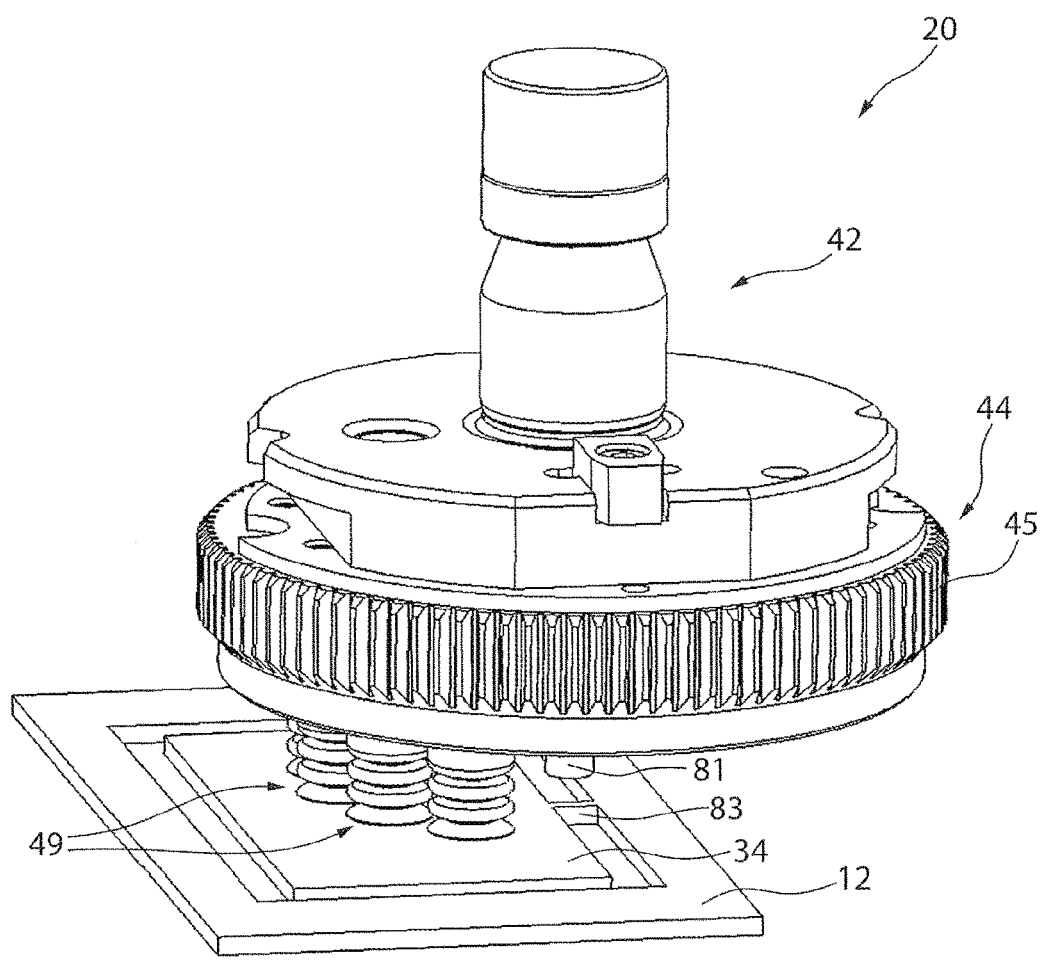
FIG. 7 shows a perspective view of the tool from FIG. 2 in a first application scenario.
Figure 8:
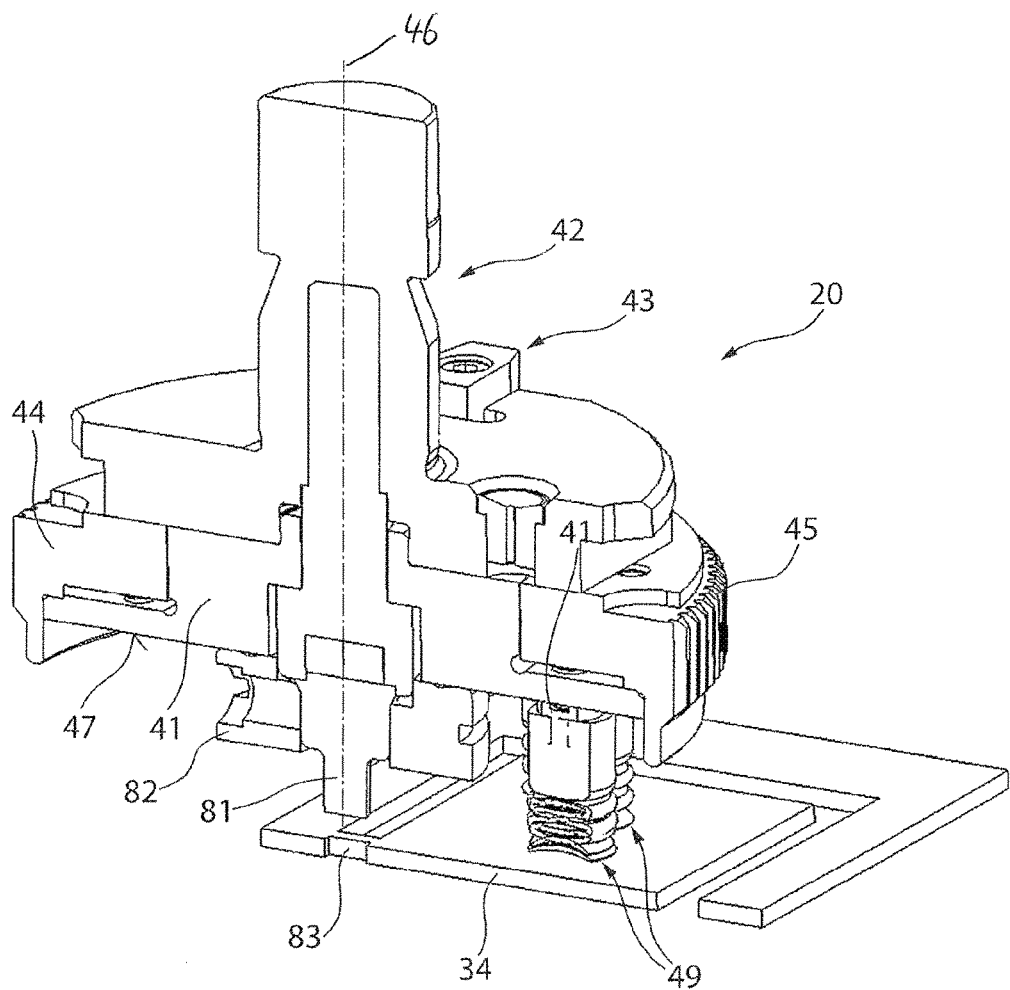
FIG. 8 shows a schematic sectional view of the tool from FIG. 7.

FIG. 7 shows a perspective view of an alternative embodiment of the tool 20 from FIG. 2. FIG. 8 shows a schematic sectional view of the tool 20.

On this tool 20, suction elements 49 are arranged in the receiving area 47 only within a partial circle. The number of suction elements 49 and/or the positioning on the receiving area 47 can be adapted to the geometry of the workpiece 34. For example, four suction elements 49 are arranged successively and positioned within a quarter-circle on the receiving area 47. As a result, a small handling surface can be formed by means of the individual suction elements 49 to handle small workpieces 34.

On this tool 20, a processing tool 81 is further provided in the receiving area 47 centrally in relation to the longitudinal center axis 46. This tool 20 according to the FIGS. 7 and 8 thus enables both the processing of the plate-shaped material 12, 13 and also the handling of the plate-shaped material 12, 13 or workpieces 34 formed from it.

The processing tool 81 can, for example, be formed as a stamping punch that is fastened on the basic tool body 41 by means of a fastening element 82, in particular a fastening flange. This processing tool 81 can be adapted in terms of the size and geometry of the processing surface to the processing task.

In the exemplary embodiment, the plate-shaped material 12 is only shown in part. In a work process not presented or described here in detail a, for example, square workpiece 34 was punched out by means of a punching process using a tool 19 from the plate-shaped material 12, wherein a bar connection 83 and/or a so-called micro-joint is left, by means of which the workpiece 34 is held and positioned within the plate-shaped material 12 or the then-formed sheet skeleton.

For removal of the workpiece 34 the tool 20 is positioned in such a way relative to the workpiece 34 that is to be removed that the processing tool 81 lies above the bar connection 83 and the suction elements 49 lie above the workpiece 34 that is to be removed. During a subsequent lowering movement of the tool 20 onto the workpiece 34, a separation of the bar connection 83 to the plate-shaped material 12 is performed. At the same time, a compression of the suction elements 49 takes place. If the stroke of the suction elements 49 is not sufficient, then the suction cups can be mounted in an axially spring-loaded bearing arrangement. The indexing wheel 44 can be rotated before, during or after the processing step, in particular the punching process, to transfer the suction elements 49 into an active position 71. Alternatively, before placing the suction elements 49 on the workpiece 34, the basic tool body 41 can be rotated around the longitudinal center axis 46 and the indexing wheel 44 can be held in a resting or stationary position 67 to transfer the suction elements 49 into an active position 71. Afterwards the lowering movement is performed and a compression of the suction elements 49 on the workpiece 34 takes place. Afterwards a lifting-off movement of the tool 20 takes place, as a result of which the suction elements 49 attach by suction to the workpiece 34. Afterwards, in the case of a processing machine as shown in FIG. 1, the sheet skeleton can be moved with the gripping device 32 to subsequently eject the workpiece 34 and remove it via the table segment 35. To do this, the basic tool body 41 or the indexing wheel 44 or both are rotated so that the suction elements 49 are transferred to a rest position 67. Venting of the suction elements 49 takes place and/or the negative pressure or the generated vacuum is cancelled, as a result of which the workpiece 34 automatically detaches from the suction elements 49. In an alternative embodiment of the workpiece processing machine 11, the workpiece 34 that is lifted up by means of the at least one suction element 49 is movable relative to the plate-shaped material 12, 13 to transfer it to an unloading station. By means of rotation of the indexing wheel 44 and/or the basic tool body 41 to transfer the at least one suction element 49 into the rest position 67, it is also possible to eject the workpiece 34.

Figure 9:
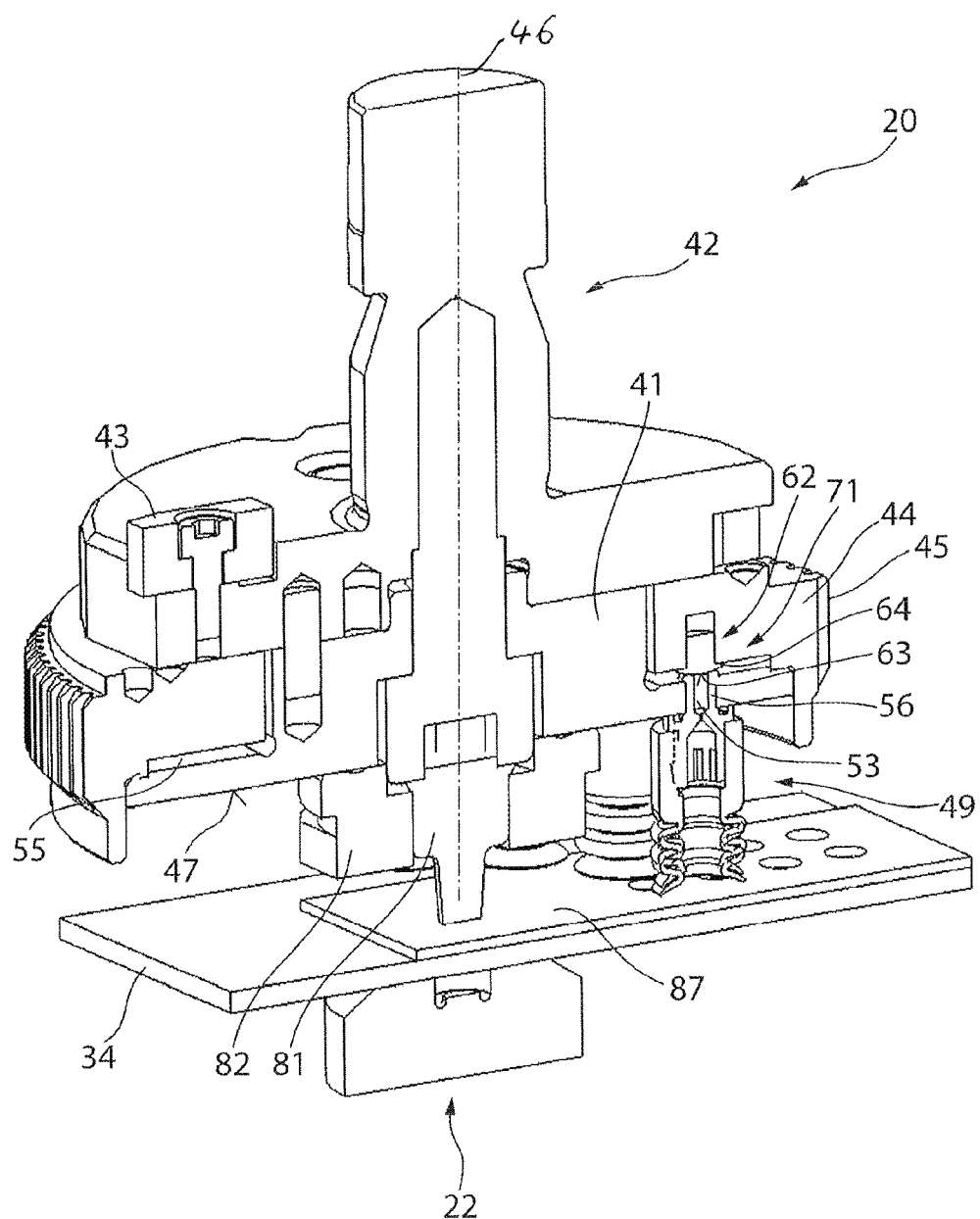
FIG. 9 shows a schematic side view of the alternative tool from FIG. 7 in a further application scenario.

FIG. 9 shows an alternative application and handling of the tool 20 compared to the FIGS. 7 and 8. FIG. 9 shows that, in a preceding handling process, the tool 20 grabs a workpiece 34 by means of the suction elements 49 and positions it relative to a second workpiece 87, so that it can subsequently perform processing of the first workpiece 34 and second workpiece 87 by means of the processing tool 81. A matching subtool 22 for the processing tool 81 is shown schematically. For example, a joint bore or breakthrough can be introduced to the first workpiece 34 and the second workpiece 87. Alternatively, a clinching process can also be provided to connect the second workpiece 87 to the first workpiece 34.

If the combined weight force of the two workpieces 34 and 87 that are connected to each other is less than the suction force of the suction elements 49, then the two workpieces 87, 34 that are connected to each other can be jointly transported. If the weight force of the two workpieces 87, 34 is greater than the suction force of the suction elements 49, then handling of the two workpieces 87, 34 can be actuated by means of a further handling device.

The schematic representation of the second workpiece 87 on the first workpiece 34 can, for example, be provided if a workpiece 34 is formed that is reinforced in partial areas. This can be done by means of two identical or different plate-shaped materials 12, 13 with each other.

Figure 10:
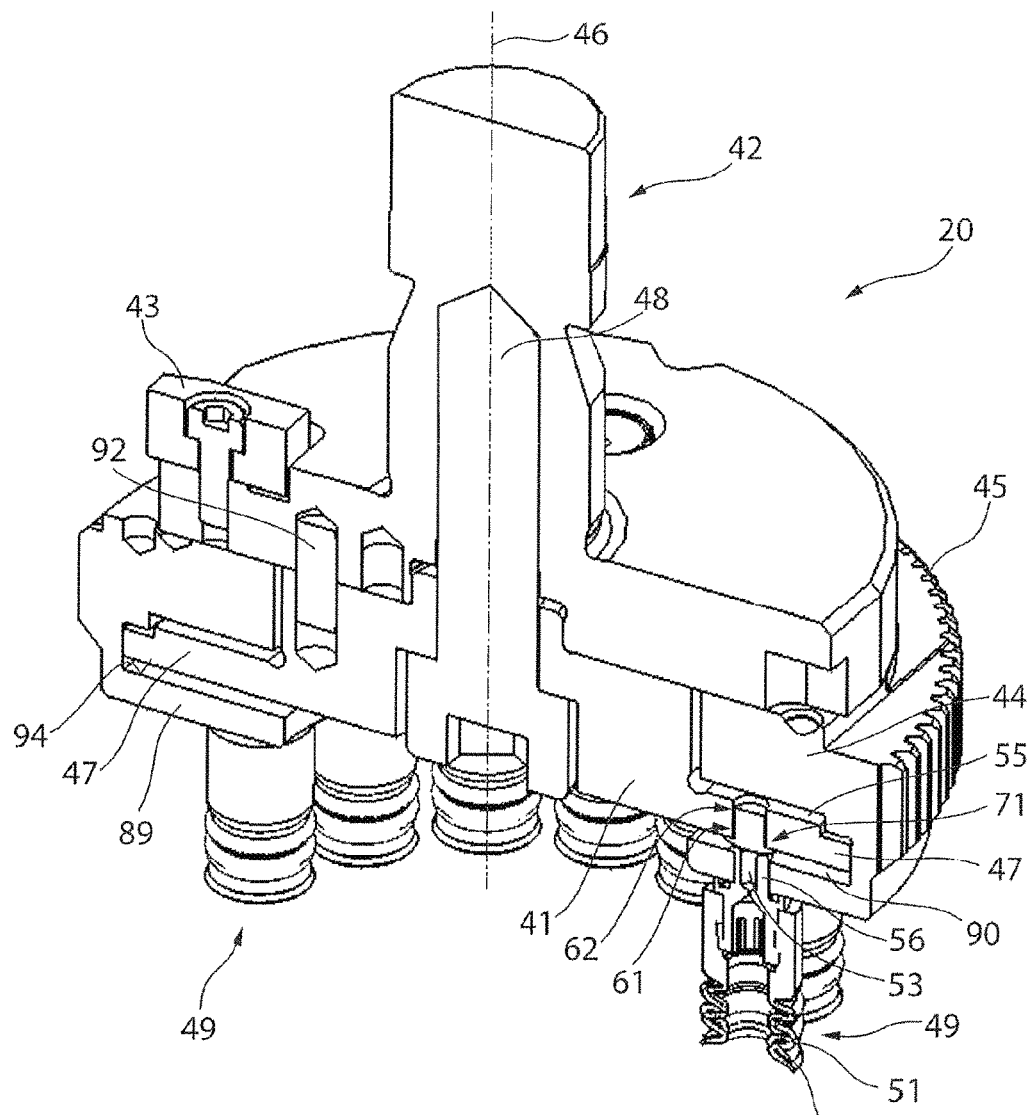
FIG. 10 shows a perspective sectional view of an alternative embodiment of the tool from FIG. 2.
Figure 11:
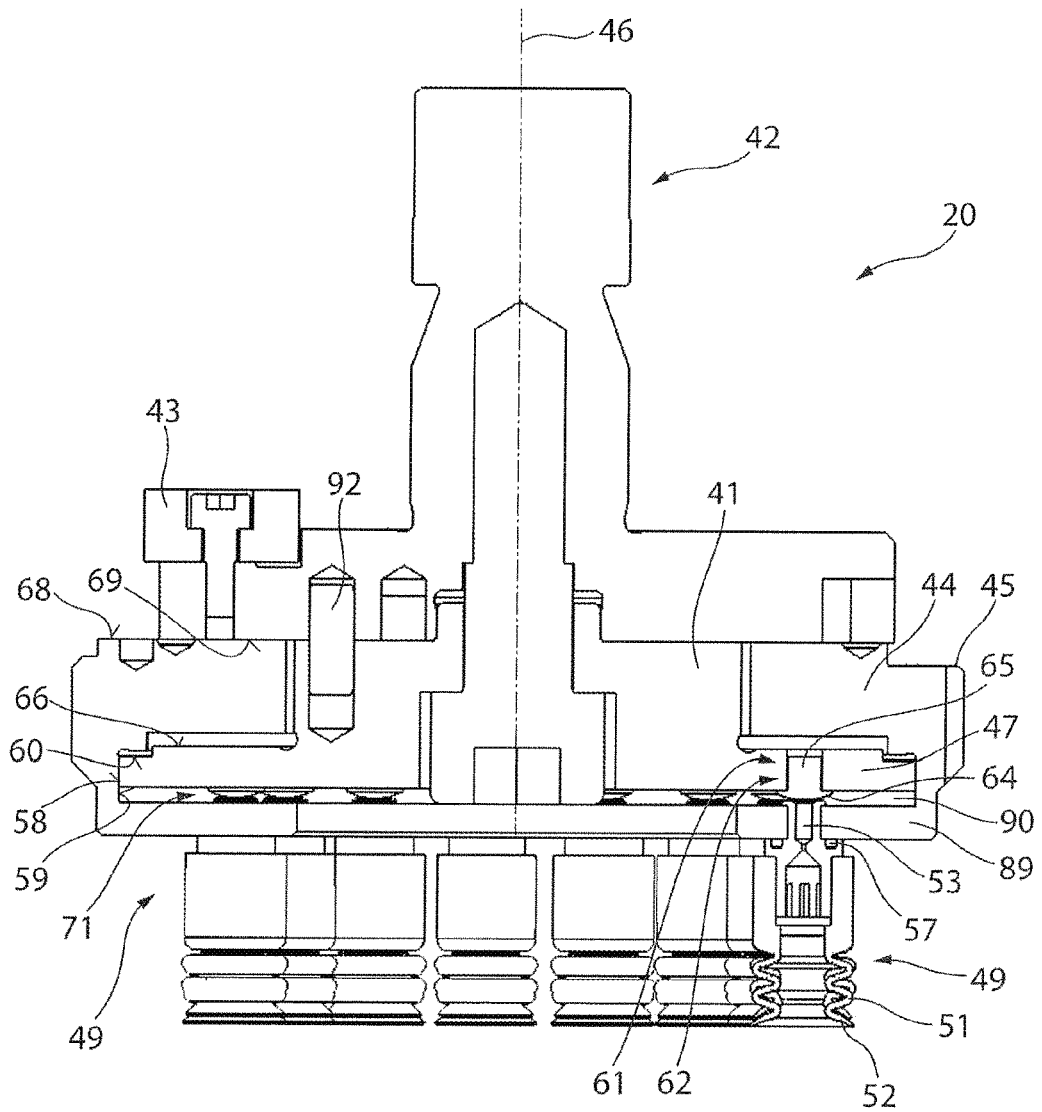
FIG. 11 shows a schematic sectional view of the tool shown in FIG. 10 in an active position.

FIG. 10 shows a perspective sectional view of an alternative embodiment of the tool 20 from FIG. 2. FIG. 11 shows a schematic sectional view of the embodiment of the tool 20 shown in FIG. 10.

This embodiment of the tool 20 corresponds to the one in the FIGS. 2 to 6. This embodiment of the tool 20 in accordance with the FIGS. 10 and 11 differs in terms of the design of the indexing wheel 44 from the embodiment in the FIGS. 2 to 6. Otherwise, reference is made in full to the description in the FIGS. 2 to 6.

The indexing wheel 41 as shown in FIGS. 10 and 11 has a holding area 89, which is formed in a disc or ring shape. This holding area 89 extends from an end section of an inner circumferential surface 59 radially to the longitudinal center axis 46. As a result, a U-shaped receiving space 90 is created, within which the receiving area 47 on the basic tool body 41 extends.

The indexing wheel 44 can be radially rotated around the longitudinal center axis 46 between the clamping pin 42 and the basic tool body 41. For the external teeth 45, the indexing wheel 44 can be held stationary relative to the basic tool body 41, which can be rotatably actuated, for example, by means of the positioning element 43, in relation to its radial alignment to the longitudinal center axis 46. Via a centering pin 92, the clamping pin 42 is non-rotatably connected to the basic tool body 41.

The at least one suction element 49 is mounted on the indexing wheel 44, in particular in the holding area 89 of the indexing wheel 44. Here, the fastening section 56, as is described for FIG. 3 by way of the example of the receiving area 47, can be arranged and fastened analogously on the holding area 89.

To form the closure 62, the control element 61 is arranged on the receiving area 47 of the basic tool body 41. An analogous arrangement applies here for the design of the control element 61 and its fastening on the indexing wheel 44 in accordance with FIG. 3 for the fastening on the receiving area 47 of the basic tool body 41.

In terms of the distance to the fastening section 56, the control element 61 is configured so that the distance corresponds to the distance between an outside 94 of the holding area 89 and the opposite side of the receiving area 47 of the basic tool body 41.

In this embodiment of the tool 20, in addition to the handling of the workpiece 34 by means of the tool 20 described in the FIGS. 2 to 6, the tool 20 can be placed with the suction elements 49 in a rest position 67 on the workpiece 34 and then the suction elements 49 and/or the suction cup 51 can be compressed. Then a rotary movement of the basic tool body 41 is actuated, so that the control elements 61 are transferred into a closing position relative to the fluid channels 53 of the suction elements 49. The suction elements 49 are then in an active position 71. During the subsequent lifting-off of the tool 20 in relation to the workpiece 34, a lengthening of the suction elements 49 and attachment by suction to the workpiece 34 take place in turn.

Alternatively, before or during the placing or even after the placing of the suction elements 49 on the workpiece 34, the basic tool body 41 can be actuated by means of a rotary motion relative to the stationary indexing wheel 44 to transfer the suction elements 49 into an active position 71. Likewise, before or during the compression of the suction elements 49, a rotatable actuation of the basic tool body 41 and a transfer of the suction elements 49 from the rest position 67 into the active position 71 can take place.

In the embodiment of the tool 20 as shown in the FIGS. 10 and 11, a processing tool 81 can likewise be provided that is arranged fixedly on the basic tool body. Insofar, the explanations for the FIGS. 7 to 9 apply with regard to the attachment of the processing tool 81 on the basic tool body 41. Likewise with regard to the method of operation. In addition, in the case of the present tool 20 shown in the FIGS. 10 and 11, the method of operation is also modified so that only when the suction elements 49 are placed on the workpiece 34 or after placing and during compression of the suction elements 49 is another rotatable actuation of the basic tool body 41 made possible. Depending on the machine concept for the workpiece processing machine 11, both the first embodiment of the tool 20 as shown in the FIGS. 2 to 6 and the second embodiment of the tool 20 as shown in the FIGS. 10 and 11 can be used.

Figure 12:
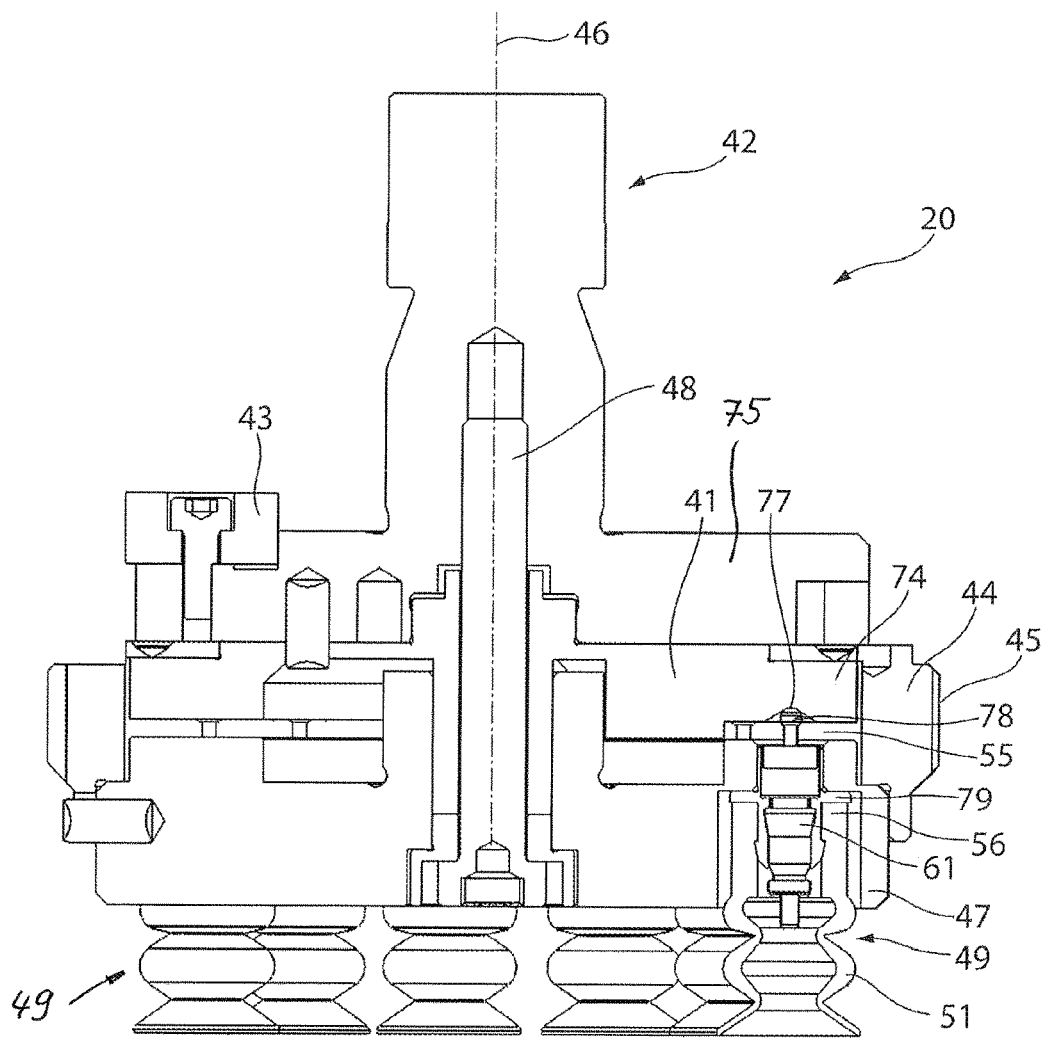
FIG. 12 shows a schematic sectional view of a further alternative embodiment of the tool from FIG. 2.

FIG. 12 shows a perspective sectional view of an alternative embodiment of the tool 20 from FIG. 2. This embodiment of the tool 20 basically corresponds to the one in the FIGS. 2 to 6. This embodiment of the tool 20 in accordance with FIG. 12 differs in terms of the design of the control element 61 and its actuation from the FIGS. 2 to 6. Otherwise, reference is made in full to the description in the FIGS. 2 to 6.

With this embodiment of the tool 20, a control disc 74 is provided between the basic tool body 41 and the clamping pin 42. This control disc 74 is surrounded by the indexing wheel 44 at the outer circumference. This control disc 74 can be non-rotatably connected to the indexing wheel 44 or formed as a single part with the indexing wheel 44. Alternatively, this control disc 74 can also be non-rotatably connected to the clamping pin 42 and/or its disc-shaped section 75.

Figure 13:
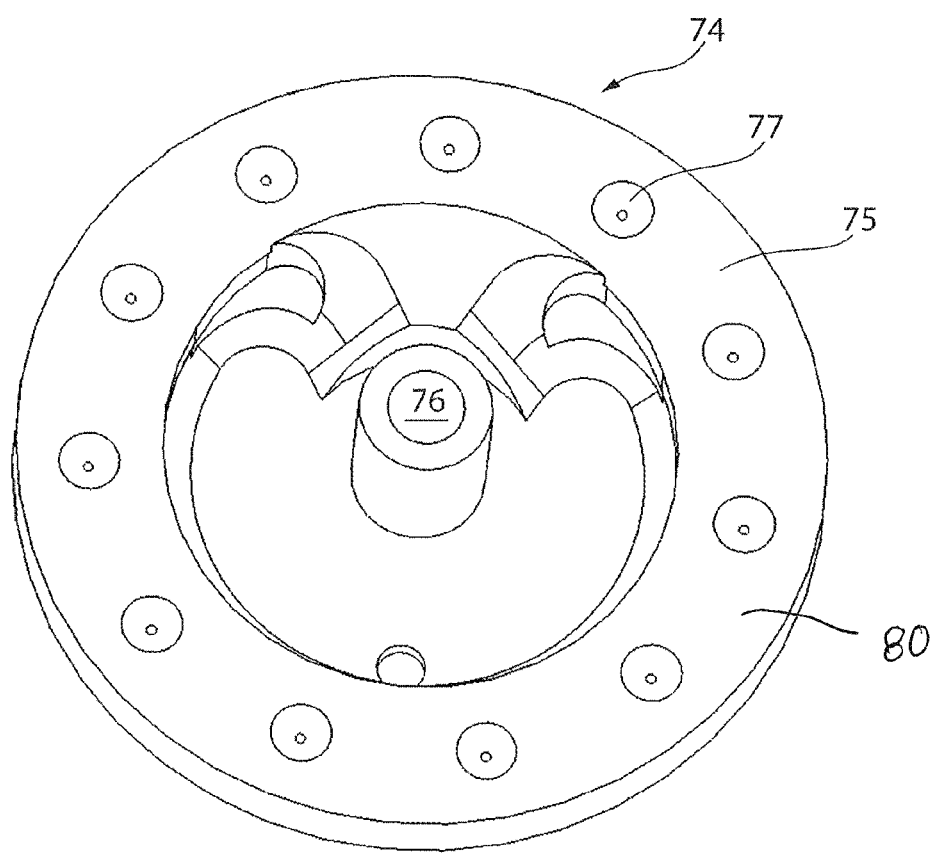
FIG. 13 shows a perspective sectional view of a control disc of the tool from FIG. 12.

This control disc 74 is shown in a perspective view from below in FIG. 13. In a central opening 76, this control disc 74 is aligned and fixed by means of the fastening element 48 in relation to the clamping pin 42. At least one control curve 77 is provided at an outer, circumferential ring section 80. This control curve 77 is shown as a conical indentation in the exemplary embodiment. Alternatively, this control curve 77 can also be formed as an elevation instead of an indentation, so that this control curve 77 is raised in relation to the surface of the ring section 80. A number of control curves 77 that corresponds to the number of control elements 61 may be provided.

With the tool 20 as shown in FIG. 12, the control element 61 is formed as a valve, which is arranged in the fluid channel 53 of the suction element 49. The control element 61 is fastened in an intermediate piece 79, which receives the suction cup 51 on the outer circumference. The intermediate piece 79 is fixedly connected to the basic tool body 41. This control element 61, which is formed as a valve, is closed in a basic position. As a result, in this basic position of the valve the suction element 49 is provided in an active position 71. The control element 61 has a plunger 78, which extends at least into the free space 55 or beyond. In certain implementations, the plunger 78 lies in the control curve 77 and/or in the indentation, as is shown in FIG. 12. In this position, the control element 61 assumes the active position 71 and is closed.

To render the suction element 49 passive, a rotary movement of the basic tool body 41 is actuated by means of the indexing wheel 44 relative to the clamping pin 42. Here, the plunger 78 is guided out from the control curve 77, in particular the indentation, and lies in the ring section 80 between two adjacent control curves 77. The plunger 78 plunges into the valve and opens the valve. The control element 61 is open and therefore passive. By means of a further rotation and/or a backwards rotation, the control element 61 can be activated again.

Figure 14:
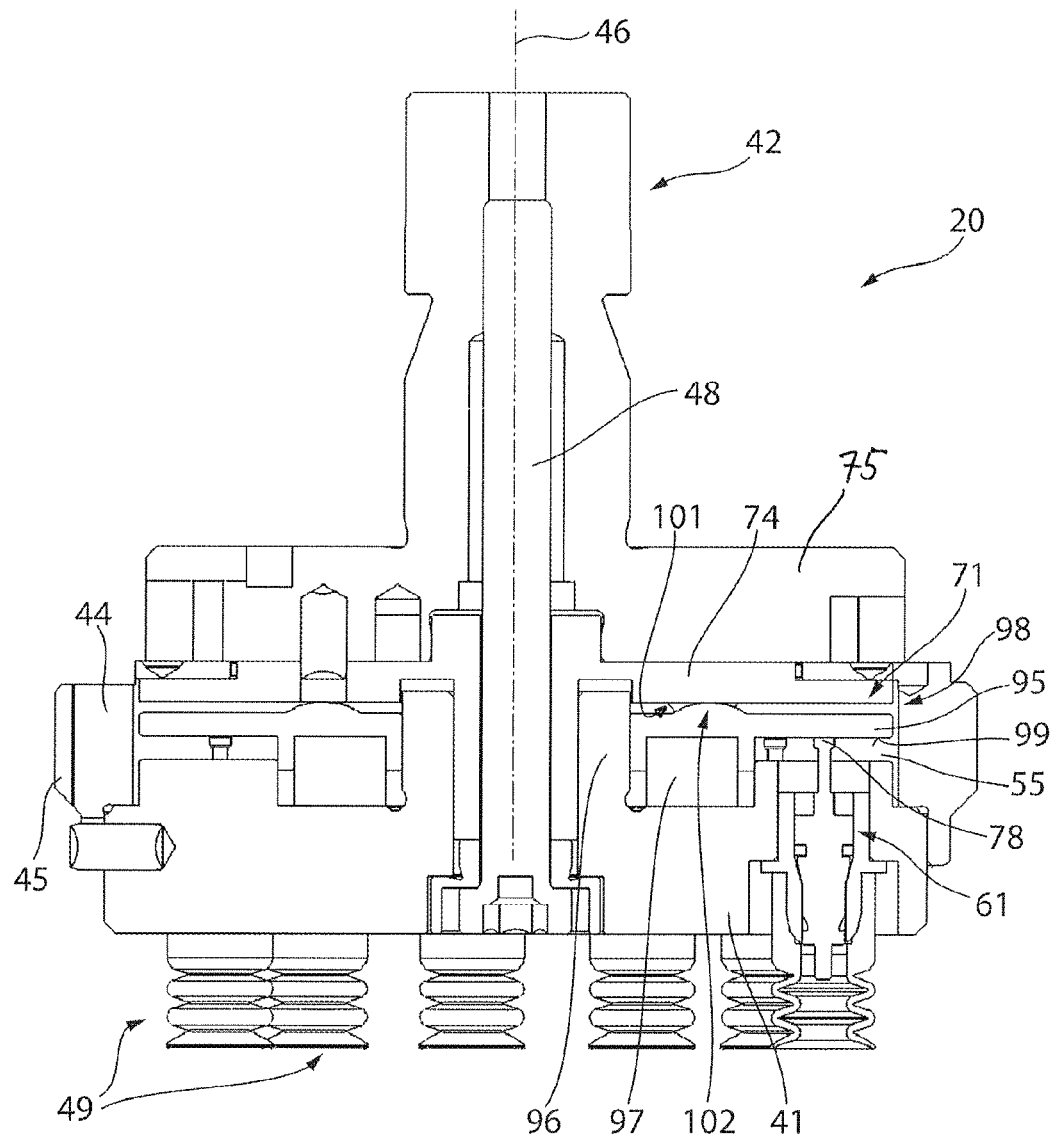
FIG. 14 shows a schematic sectional view of a further alternative embodiment of the tool from FIG. 12 in an active position.

FIG. 14 shows an alternative embodiment of the tool 20 from FIG. 12. This embodiment of the tool 20 as shown in FIG. 14 differs from the tool 20 shown in FIG. 12, in that an activation disc 95 is provided between the basic tool body 41 and the control disc 74 that actuates the control element 61. Otherwise, the statements regarding FIGS. 2 to 6 and for the FIGS. 12 to 13 apply.

The tool 20 as shown in FIG. 14 is shown in an active position 71. The activation disc 95 is mounted on a ring collar 96 of the basic tool body 41. The activation disc 95 is movably mounted along the ring collar 96 in the axial direction in relation to the longitudinal center axis 46 of the tool 20 with a lifting movement via the control disc 74. An elastic, flexible return element 97 is provided between the basic tool body 41 and the activation disc 95 that arranges the activation disc 95 in a starting position 98 as shown in FIG. 14. The activation disc 95 has a ring-shaped control surface 99, on which the plunger 78 of the control element 61, which is formed as a valve, abuts. Alternatively, this activation disc 95 can have a control curve 77 in accordance with the control disc 74 in FIG. 13.

Figure 15:
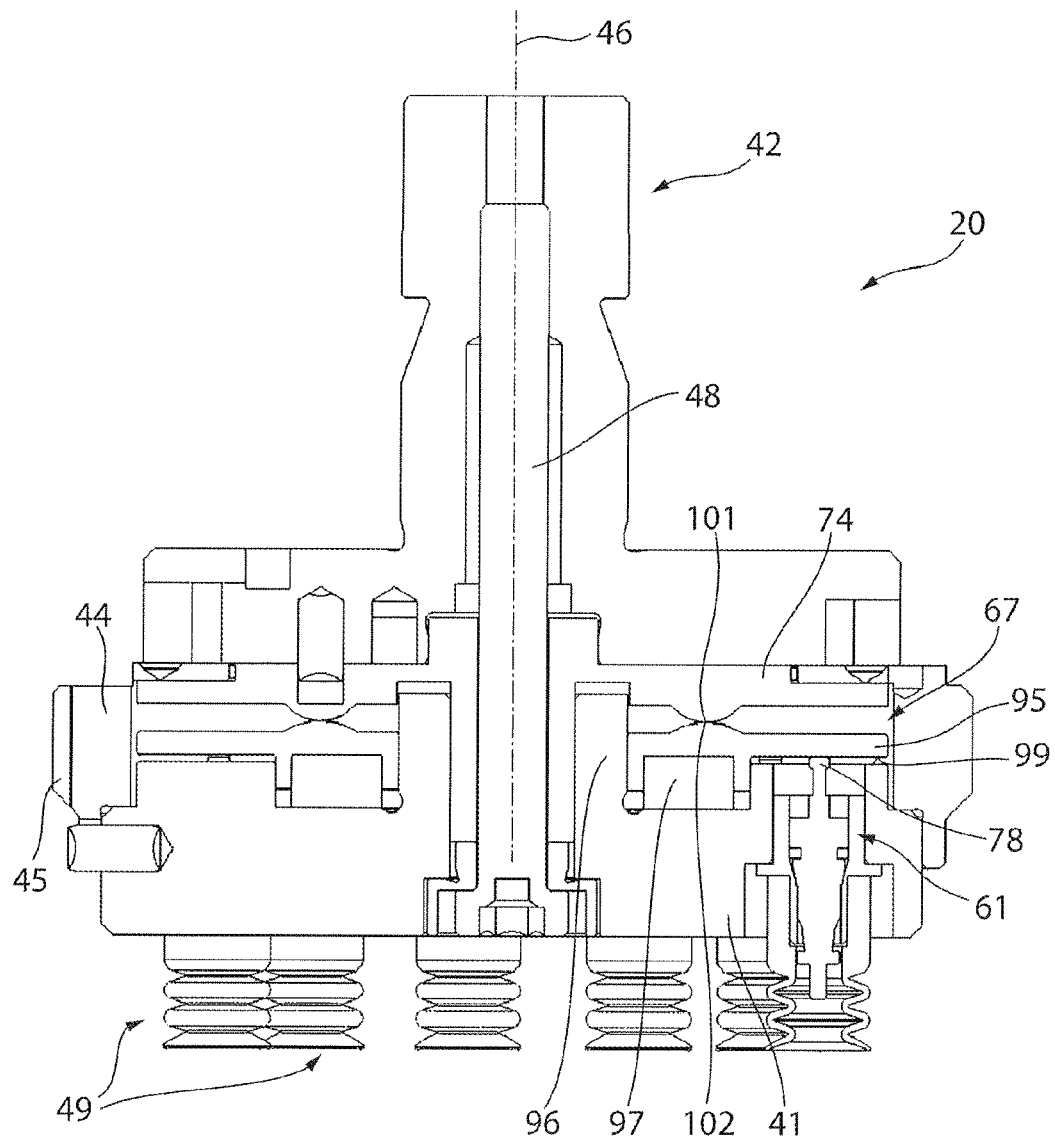
FIG. 15 shows a schematic sectional view of the tool from FIG. 14 in a rest position.

At the control disc 74, as shown in the embodiment in FIG. 14, a plurality of first elevations 101 that are aligned in the direction towards the activation disc 95 is provided, and these are located on a shared circumference with the second elevations 102 that are arranged on the activation disc 95. In the active position 71, the relevant elevations 101, 102 are positioned with gaps between one another. By means of a rotary movement of the clamping pin 42 relative to the basic tool body 41 and/or the indexing wheel 44, the elevations 101, 102 are moved towards each other. On account of their tapered form or the beveled incline 64 attached to it, the elevations 101, 102 are transferable to a working position as shown in FIG. 15. The elevation 101 of the control disc 74 lies directly opposite the second elevation 102 on the activation disc 95. The return element 97 is pressed together. The plunger 78 plunges into the valve, as a result of which the control element 61 is opened. The suction element 49 is thus vented, i.e. passive.

This embodiment offers the advantage that the actuation of the control element 61, in particular the plunger 78, is performed solely by means of an axial movement acting on the plunger 78. As a result, an actuation mechanism that is free from lateral forces is enabled.

Figure 16:
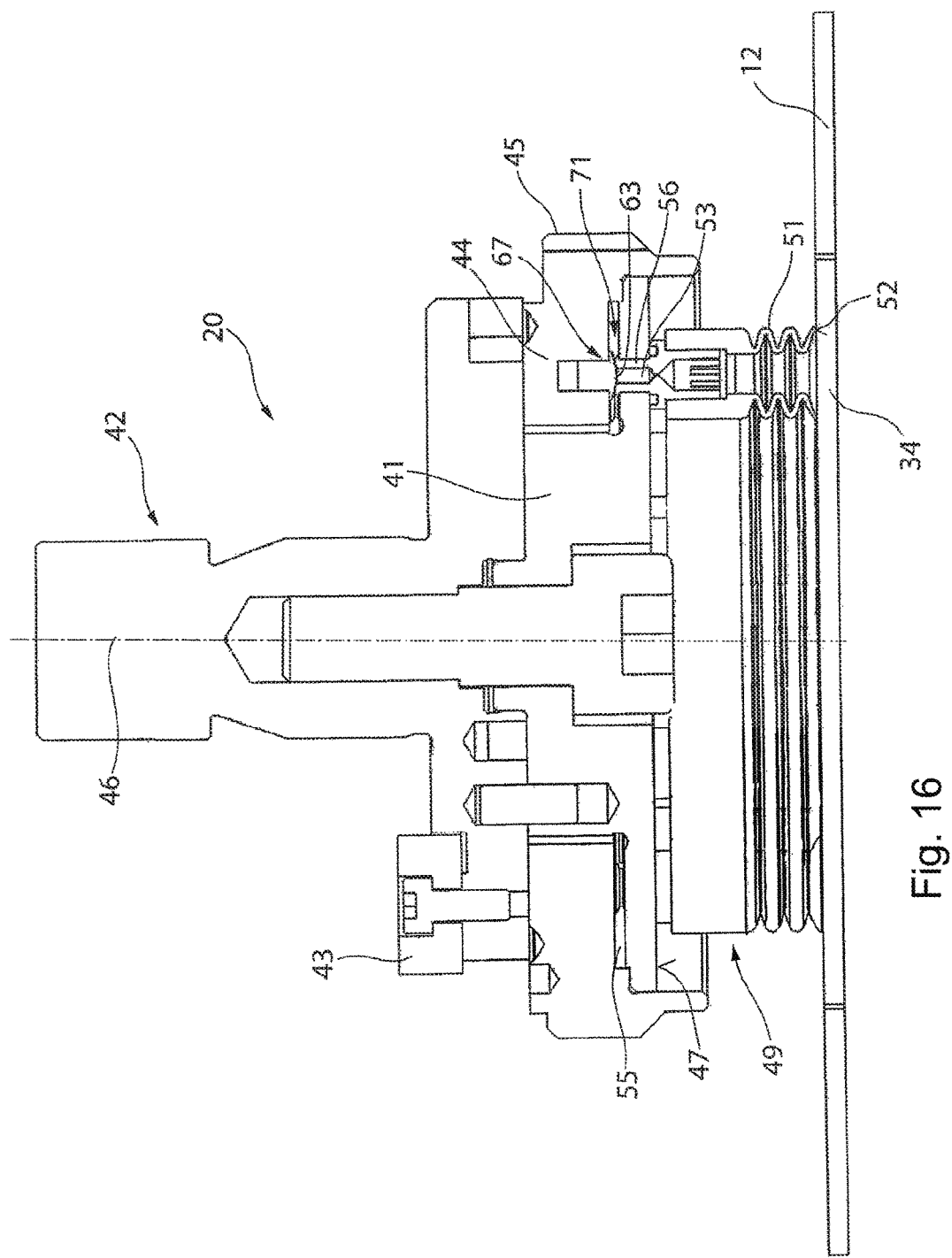
FIG. 16 shows a schematic sectional view of a further alter-native embodiment of the tool from FIG. 12 in an active position.

FIG. 16 shows a schematic sectional view of a further alter-native embodiment of the tool from FIG. 12 in an active position. In particular, in FIG. 16, suction element 49 comprises a suction cup 51 as a ringed shaped suction element that extends through at least a partial circumferential section and may extend completely 360 degrees through a circumferential section.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A tool for the handling of a workpiece in a processing machine, the tool comprising:
    a tool body;
    a clamping pin coupled to the tool body;
    an indexing wheel rotatably coupled to the tool body and positioned between the clamping pin and the tool body, wherein the indexing wheel is rotatable relative to the tool body and the clamping pin; and
    at least one suction element coupled to at least one of the tool body and the indexing wheel, wherein the suction element comprises a fluid channel, wherein the fluid channel is selectably, communicably coupled to a space formed at least in part in one or more of the tool body and the indexing wheel, and wherein the at least one of the tool body and the indexing wheel is configured to transfer the at least one suction element from a rest configuration, in which the fluid channel is open to the space, into an active configuration, in which the fluid channel is closed to the space and in which the at least one suction element is lengthened,
    whereby in the active position, the at least one suction element is configured to attach by suction to the workpiece.

2. The tool of claim 1, wherein the fluid channel of the at least one suction element is aligned in the direction towards the indexing wheel or the tool body.

3. The tool of claim 1, wherein for activation of the at least one suction element, the indexing wheel or the tool body is transferable by rotary movement, around a longitudinal center axis of the tool body, in relation to the tool body or the indexing wheel into the active position, and by a further rotary movement of the indexing wheel or the tool body in the same direction of rotation or in the opposite direction of rotation into the rest position.

4. The tool of claim 1, wherein a control element that is aligned facing towards the suction element and opens and closes the fluid channel is provided on at least one of the indexing wheel and the tool body.

5. The tool of claim 4, wherein the control element is formed as a closure having a closing surface that closes the fluid channel, and in that a circumferential beveled incline is provided adjacent to the closing surface.

6. The tool of claim 1, wherein a control disc is provided on at least one of the indexing wheel the clamping pin or on the tool body, that is non-rotatably connected to the indexing wheel or the tool body or the clamping pin and that has at least one control curve, which opens and closes at least one control element that is arranged in the suction element.

7. The tool of claim 6, wherein between the control disc and the tool body or between the control disc and the indexing wheel or between the clamping pin and the control disc, an activation disc is provided, which, under a rotary motion of the control disc, is actuatable by means of a lifting movement along the longitudinal central axis of the tool body and opens and closes the at least one control element that is provided in the suction element.

8. The tool of claim 6, wherein the control element is formed as a valve.

9. The tool of claim 8, wherein the valve comprises an operable plunger.

10. The tool of claim 1, wherein the at least one suction element is provided by means of a detachable connection on the tool body or the indexing wheel.

11. The tool of claim 1, wherein the at least one suction element has a fastening section that includes the fluid channel and on which a suction cup is arranged.

12. The tool of claim 11, wherein the at least one suction cup of the suction element is formed in a bellows shape and has a ring-shaped support surface.

13. The tool of claim 1, wherein a plurality of suction elements is provided that are arranged successively in a circumference on the tool body or on the indexing wheel, or in that at least one ring-shaped suction element is provided, which extends through a partial section of a circumference or completely through 360°.

14. The tool of claim 13, wherein adjacent to the at least one suction element or within the ring-shaped suction element or the plurality of suction elements arranged in a circumference, at least one processing tool is provided.

15. The tool of claim 14, wherein the processing tool is at least a punching tool or a clinching tool or both.

16. The tool of claim 14, wherein the at least one processing tool provided on the tool body is provided fixedly on the tool body or is activatable by means of the indexing wheel.

17. The tool of claim 16, wherein one end face of the processing tool is provided opposite one end face of the at least one suction element either set back or with both at the same height at a distance from the tool body.

18. A method for handling a workpiece, in a workpiece processing machine, comprising:
- placing and compressing at least one suction element coupled to a receiving area of at least one of a tool body and an indexing wheel rotatably coupled to the tool body on the workpiece that is to be handled, wherein the indexing wheel is positioned between a clamping pin coupled to the tool body and the tool body, and wherein the indexing wheel is rotatable with relative to the tool body and the clamping pin,
- before, during, or after the placing of the at least one suction element on the workpiece, rotating at least one of the indexing wheel and the tool body to transfer the at least one suction element into an active configuration, in which a fluid channel of the at least one suction element is closed to a space formed in the at least one of the tool body and the indexing wheel to which the at least one suction element is coupled; and
- lifting the tool body so as to lengthen the at least one suction element, whereby the at least one suction element is attached by suction to the workpiece and whereby the workpiece that is held by the at least one suction element is lifted up.

19. The method of claim 18, further comprising processing the workpiece via at least one processing tool positioned in the receiving area of the tool body adjacent to the at least one suction element at least one of before, during or after one or more of placing and compressing of the at least one suction element on the workpiece.

* * * * *